United States Patent
Stamps et al.

(10) Patent No.: US 8,926,281 B2
(45) Date of Patent: Jan. 6, 2015

(54) COMPACT ROTORCRAFT DUAL-ELEMENT SPHERICAL ELASTOMERIC CENTRIFUGAL-FORCE BEARING ASSEMBLY

(75) Inventors: Frank B. Stamps, Colleyville, TX (US); Bryan Wade Marshall, Mansfield, TX (US); Terry K. Thompson, Bedford, TX (US); Orion Braziel, Fort Worth, TX (US); David Popelka, Colleyville, TX (US); Patrick Tisdale, Roanoke, TX (US)

(73) Assignee: Textron Innovations Inc., Fort Worth, TX (US)

( * ) Notice: Subject to any disclaimer, the term of this patent is extended or adjusted under 35 U.S.C. 154(b) by 502 days.

(21) Appl. No.: 13/401,203

(22) Filed: Feb. 21, 2012

(65) Prior Publication Data
US 2013/0216384 A1    Aug. 22, 2013

(51) Int. Cl.
*F01D 25/16* (2006.01)

(52) U.S. Cl.
USPC ..................................................... 416/134 A

(58) Field of Classification Search
USPC ............... 416/134 A, 134 R, 135, 147, 148; 384/220, 221, 222
See application file for complete search history.

(56) References Cited

U.S. PATENT DOCUMENTS

| | | | |
|---|---|---|---|
| 3,862,812 A | | 1/1975 | Gorndt et al. |
| 4,512,717 A | * | 4/1985 | Pancotti et al. ........... 416/134 A |
| 4,732,540 A | | 3/1988 | Mouille et al. |
| 4,986,735 A | | 1/1991 | Robinson |
| 5,601,408 A | | 2/1997 | Hunter et al. |

FOREIGN PATENT DOCUMENTS

JP     2004268623     9/2004

OTHER PUBLICATIONS

European Search Report dated Dec. 21, 2012 from counterpart EP App. No. 12161903.5.
Office Action dated May 8, 2014 from counterpart CA App. No. 2805889.

* cited by examiner

*Primary Examiner* — Edward Look
*Assistant Examiner* — Aaron R Eastman
(74) *Attorney, Agent, or Firm* — James E. Walton; Richard G. Eldredge

(57) ABSTRACT

A rotary system includes a retention member and a flexible yoke having an opening forming a bridge. The rotary system is further provided with two bearing assemblies, a first bearing assembly extending through the opening of the yoke and configured to secure a rotor blade to the retention member and a second bearing assembly extending through the opening of the flexible yoke and configured to secure the rotor blade to the bridge. The second bearing element includes a bearing element having a first surface forming a spherical contouring and an opposing integral second surface forming a conical contouring.

18 Claims, 6 Drawing Sheets

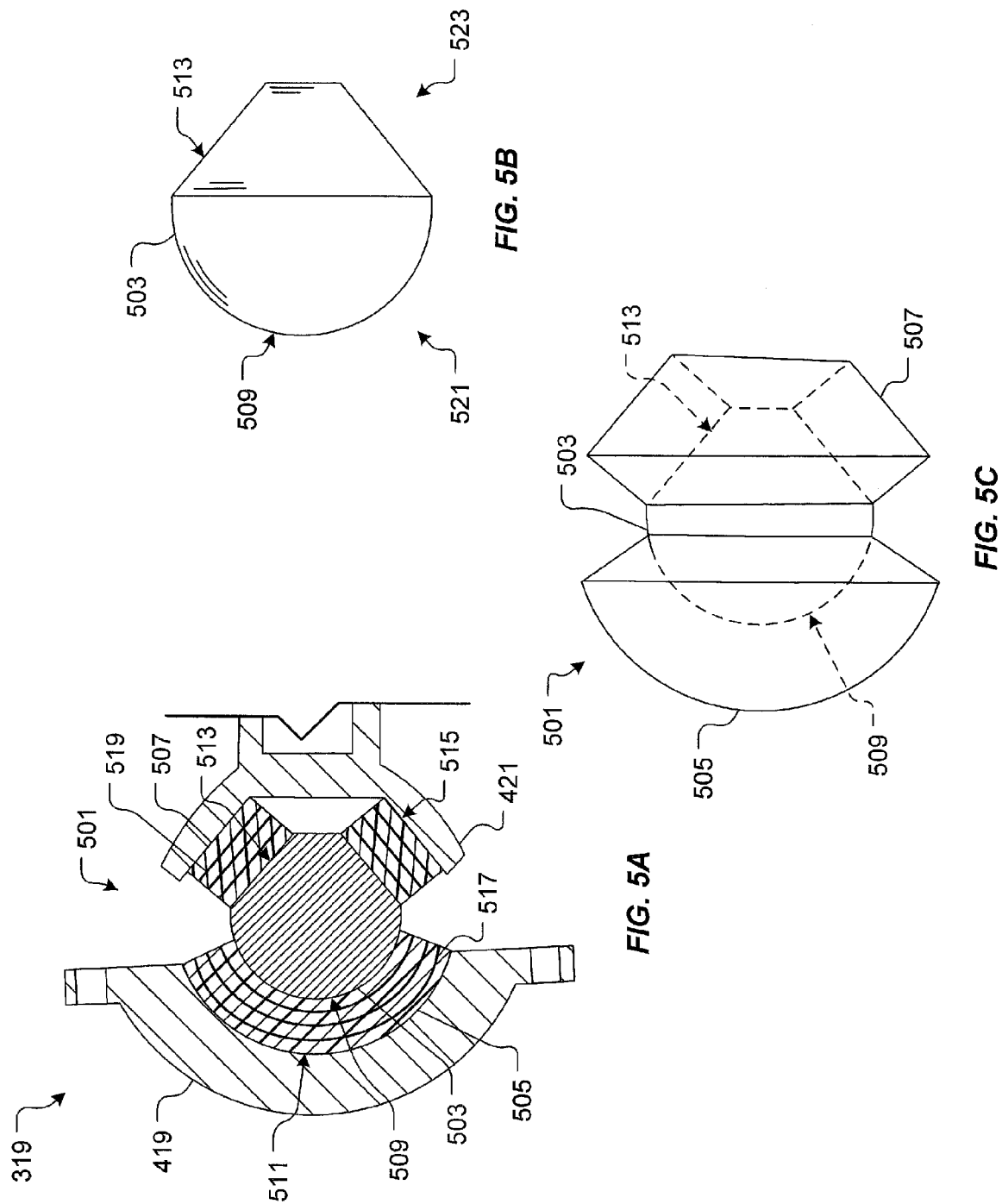

COMPACT ROTORCRAFT DUAL-ELEMENT SPHERICAL ELASTOMERIC CENTRIFUGAL-FORCE BEARING ASSEMBLY

BACKGROUND

1. Field of the Invention

The present application relates generally to rotary systems, and more particularly, to a rotary system having one or more bearing assemblies. The present application is well suited for use in the field of aircraft, for example, helicopters, tiltrotor, and other rotary wing aircraft.

2. Description of Related Art

Conventional rotary systems are well known in the art for effectively reacting movement of an aircraft during flight. The rotary systems utilize a hub retention assembly as the primary structural for driving torque to and reacting loads created by a plurality of rotor blades rotatably attached thereto. In some embodiments, the rotary system employs one or more bearing assemblies to react blade forces exerted on the retention member, for example, lead/lag, coning, feathering, and centrifugal blade forces.

The above bearing assemblies typically include an arrangement of elastomeric material for reacting to the rotor blade forces. In one known embodiment, the bearing assembly is provided with an axisymmetric spherical bearing element disposed between layers of elastomeric material to facilitate stability and to further control the bearing assembly. U.S. Pat. No. 5,601,408 illustrates an articulated rotor system of the type described above and is generally indicative of the current state-of-the art rotary system with a bearing assembly having an axisymmetric bearing element.

Although great strides have been made in rotary assemblies, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

FIG. 5A-5C are various views of a bearing assembly element of the rotary system;

Figure 1:
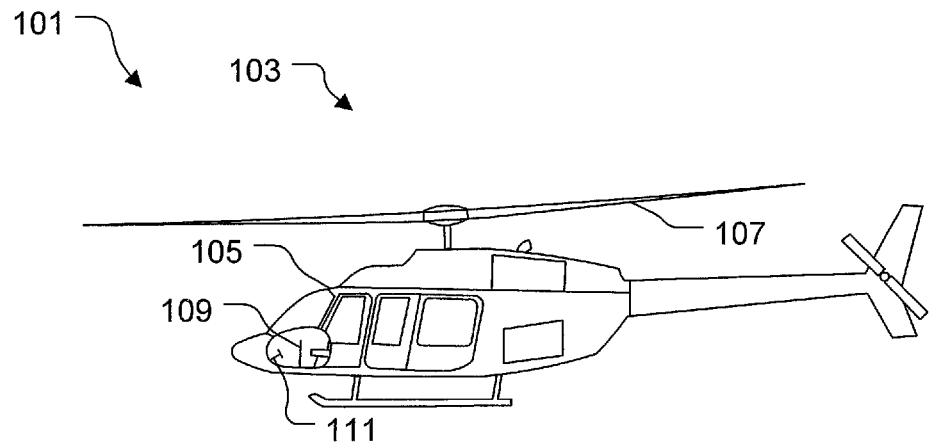
FIG. 1 is a side view of a rotary aircraft utilizing a rotary system of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with assembly-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system of the present application overcomes common disadvantages associated with conventional rotary systems. Specifically, the rotary system provides effective means for reacting rotor blade forces exerted on the retention member, namely, centrifugal, flapping, feathering, lead/lag, coning, and/or other blade forces. To achieve these features, the rotary system comprises at least one bearing assembly having a bearing element disposed between elastomeric materials. In the preferred embodiment, the bearing element is manufactured with two different opposing surface contouring: a spherical surface and a conical surface. The rotary system is further provided with a flexible yoke, which in turn provides further reaction of the blade forces.

The system and method of the present application will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that features, elements, and/or functions of one embodiment may be incorporated into another embodiment as appropriate, unless described otherwise.

Figure 2:
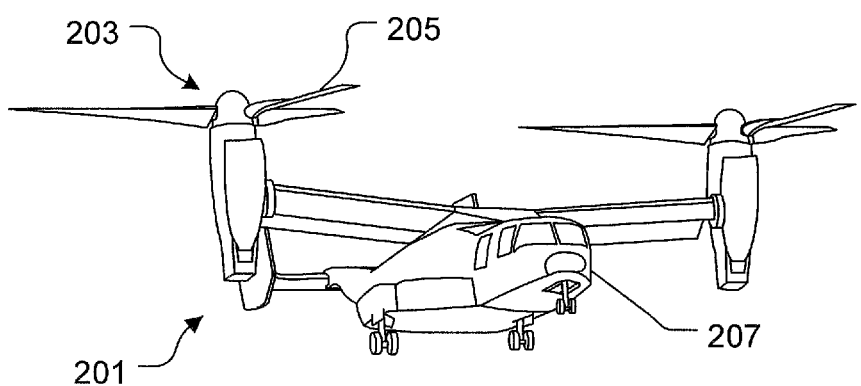
FIG. 2 is an oblique view of a tiltrotor aircraft utilizing the rotary system of the present application.

Referring now to the drawings wherein like reference characters identify corresponding or similar elements throughout the several views, FIGS. 1 and 2 show two different rotary aircraft utilizing the rotary system of the present application. FIG. 1 depicts a side view of a helicopter 101, while FIG. 2 depicts an oblique view of a tiltrotor aircraft 201.

Helicopter 101 comprises a rotary system 103 carried by a fuselage 105. One or more rotor blades 107 operably associated with rotary system 103 provide flight for helicopter 101 and are controlled with a plurality of controllers within fuselage 105. For example, during flight a pilot can manipulate the cyclic controller 109 for changing the pitch angle of rotor blades 107 and/or manipulate pedals 111, thus providing vertical, horizontal, and yaw flight movement.

Tiltrotor aircraft 201 includes two or more rotary systems 203 having a plurality of proprotors 205 and carried by rotatable nacelles. The rotatable nacelles provide means for allowing aircraft 201 to takeoff and land like a conventional helicopter and for horizontal flight like a conventional fixed wing aircraft. It should be understood that, like helicopter 101, tiltrotor aircraft 201 is provided with controls, e.g., cyclic controllers and pedals, carried within the cockpit of fuselage 207, for reacting movement of the aircraft.

Figure 3:
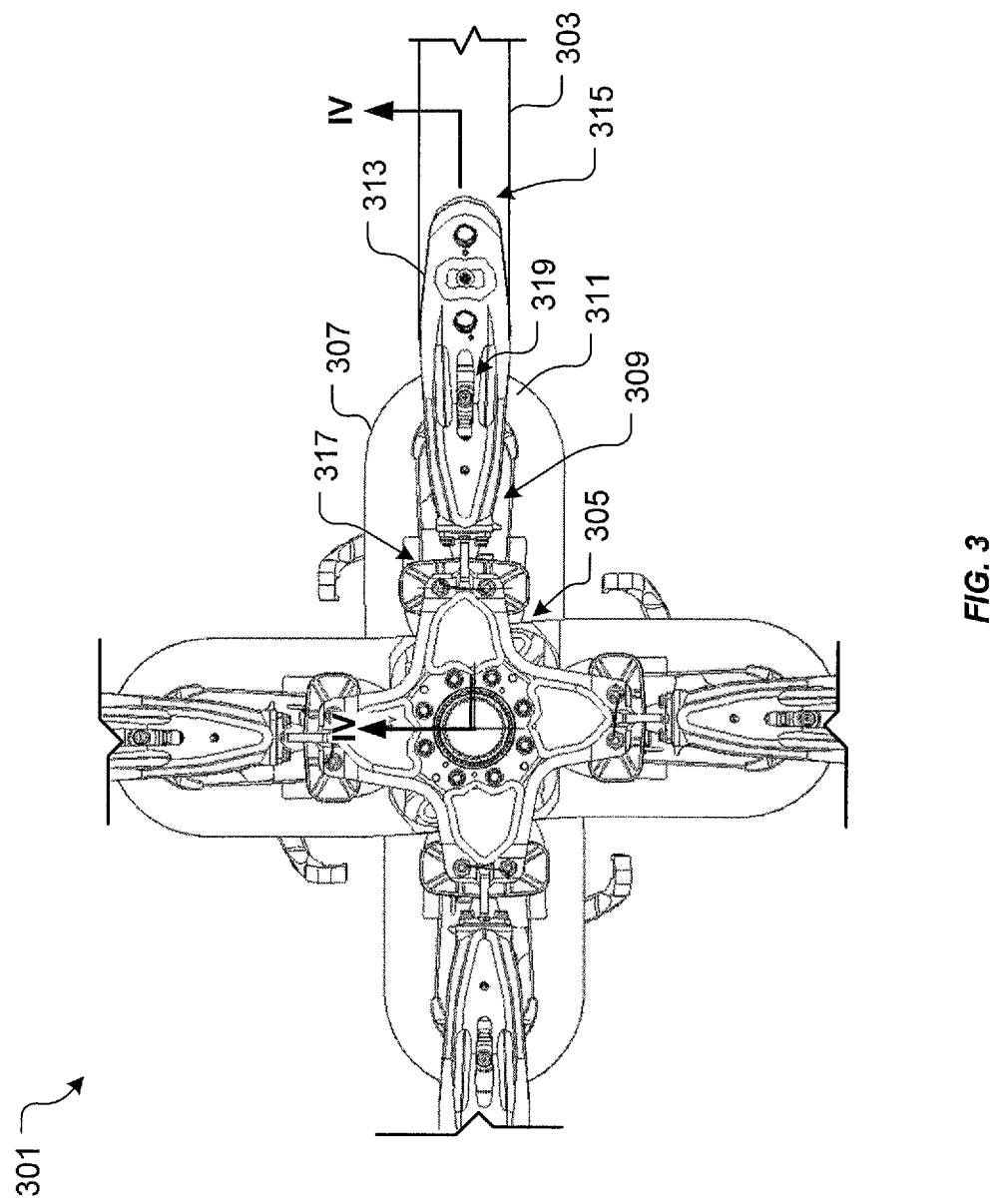
FIG. 3 is a top view of the rotary system according to the preferred embodiment of the present application.
Figure 4:
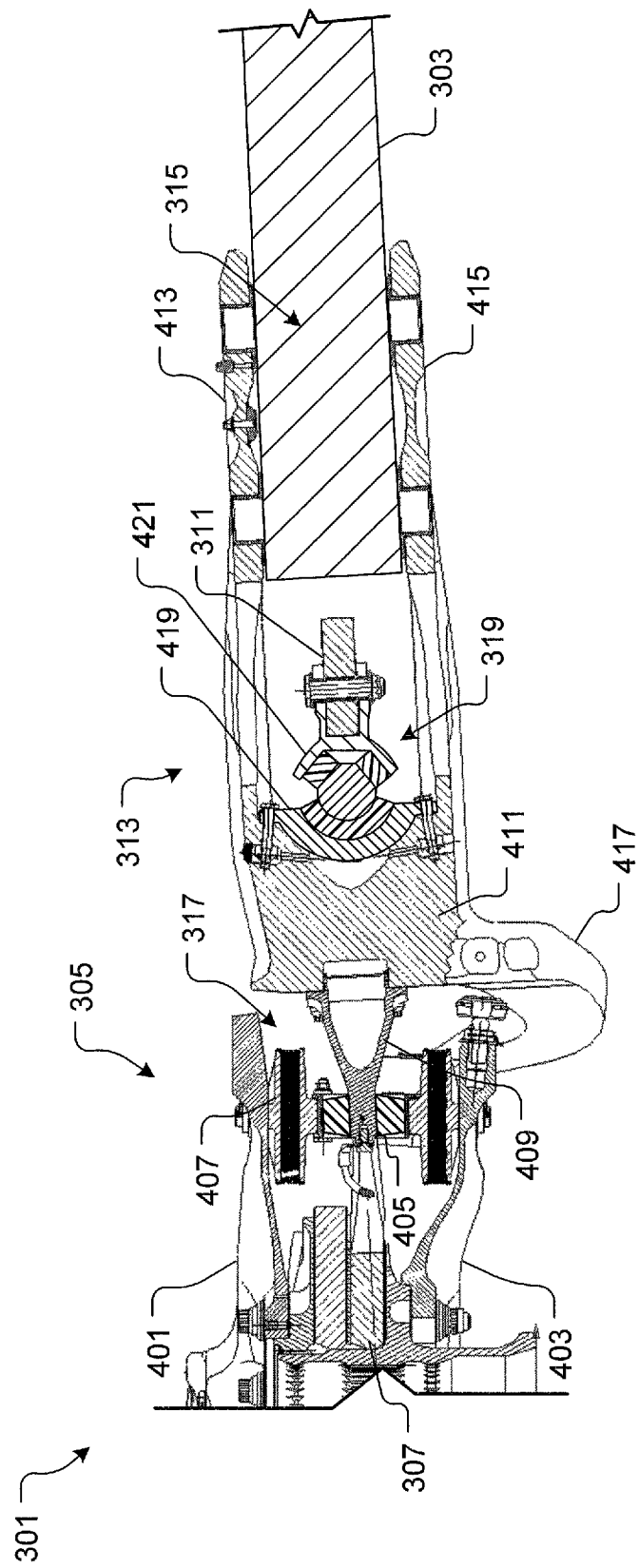
FIG. 4 is a cross-sectional view of a portion of the rotary system of FIG. 3 taken at IV-IV.

Referring next to FIGS. 3 and 4 in the drawings, a rotary system 301 according to the preferred embodiment of the present application is shown. FIG. 3 depicts a top view of rotary system 301, while FIG. 4 depicts a cross-sectional view of rotary system 301 taken at IV-IV of FIG. 3.

It will be appreciated that rotary system 301 efficiently reduces, if not eliminates, the adverse effects of the rotor blade forces exerted against the rotary system during flight. It should be understood the both rotary system 103 and 203 include the features of rotary system 301. Thus, the features of rotary system 301 discussed herein are utilized in rotary systems for helicopters, tilt rotor aircraft, and other types of rotary aircraft.

Rotary system 301 includes a plurality of rotor blades 303 operably associated with a retention member 305. Retention member 305 is driven by an aircraft engine rotatably coupled to a rotor mast (not shown) and is manipulated via a swashplate (not shown) during flight. In the illustrative embodiment, rotary system 301 is shown having four rotor blades 303; however, the present application contemplates more or less rotor blades in an alternative embodiment.

For ease of description, not all of the required systems and devices operably associated with rotary system 301 are shown and discussed. Examples of such system include, but are not limited to, sensors, connectors, power sources, mounting supports, circuitry, software, control systems, and the like, which are not all shown in order to clearly depict the novel features of the rotary system of the present application. However, it should be understood that the rotary system disclosed herein is operably associated with these and other required systems and devices for operation, as conventionally known in the art, although not discussed in detail nor depicted in the drawings.

Retention member 305 includes a flexible yoke 307 for securing the rotor blades 303 thereto. For ease of description, only a portion of yoke 307, rotor blade 303, and operably associated components of system 301 are depicted and discussed in detail. However, it should be understood that the yoke members, rotor blades, and other components of rotary system 301 are substantially similar in form and function, and include the features discussed herein.

It will be appreciated that yoke 307 is preferably manufactured with flexible material, e.g., laminate and/or fiberglass material, that allows for flexure as blade forces are exerted thereagainst. One of the unique features of Yoke 307 is an opening 309 extending the thickness therethrough. Opening 309 forms a bridge 311 that receives the root of the rotor blade and a bearing assembly. More specifically, a blade grip 313 is utilized to attach a root portion 315 of rotor blade 303 to bridge 311. In the preferred embodiment, a first bearing assembly 317 elastically couples grip 313 to retention member 305, while a second bearing assembly 319 elastically couples grip 313 to bridge 311. Further discussion of these bearing assemblies is provided below. It should be understood that the combination of a flexible yoke and the bearing assemblies provides efficient means for reacting the blade forces exerted against the retention member during flight.

Referring specifically to FIG. 4, bearing assembly 317 is selectively positioned between a top spoke arm 401 and a bottom spoke arm 403 of retention member 305. Bearing assembly 317 comprises one or more of a bearing 405 securely bonded to a housing 407 that in turn is rigidly attached to both spoke arms 401 and 403. Bearing 405 securely receives and attaches to a grip support member 409 secured to a base portion 411 of grip 313. In the preferred embodiment, bearing 405 is a radial shear bearing formed with layers of elastomeric material. An optional feature would include a plurality of rigid shims layered within the elastomeric material for providing a desired shear resistance.

Grip 313 comprises a top plate 413, a bottom plate 415, and a pitch horn 417, which all integrally attach to base portion 411. Both plates 413 and 415 provide efficient means for attaching blade root 315 therebetween in any convenient manner, for example with bolts. Disposed between plates 413 and 415, and positioned within opening 309, is bearing assembly 319.

In the exemplary embodiment, bearing assembly 319 is provided with a housing 419 and a support member 421. In FIGS. 5A-5B, various views of bearing assembly 319 are illustrated. Bearing assembly 319 further comprises a bearing 501 securely held in positioned with housing 419 and support 421. Bearing 501 includes a bearing element 503, a first elastomeric material 505, and a second elastomeric material 507. As is depicted, first elastomeric material 505 is sandwiched between a first surface 509 of bearing element 503 and a surface 511 of housing 419, while the second elastomeric material 507 is sandwiched between a second surface 513 of bearing element 503 and a surface 515 of support 421. The elastomeric material is preferably bonded through a vulcanization process; however, alternative bonding means could easily be employed in different embodiments. It will be appreciated that the elastomeric materials 505 and 507 take the form of the surfaces being bonded thereto. An optional feature would include a plurality of rigid shims 517 and 519 layered within respective elastomeric material 505 and 507 for adding additional support and rigidity.

In FIG. 5B, bearing element 503 is shown comprising a first section 521 having a spherical profile and a second section 523 having a conical section, wherein the conical contouring includes a larger diameter near section 521 and gradually decreases away therefrom. It will be appreciated that the selective contouring of bearing element 503 allows compensation for lead/lag, flapping, and one-half of the feathering blade forces relative to the spherical contouring, while allowing for a single moment of freedom relative to the conical contouring to react for one-half of the remaining feathering blade forces.

Figures 6A, 6B, 6C:
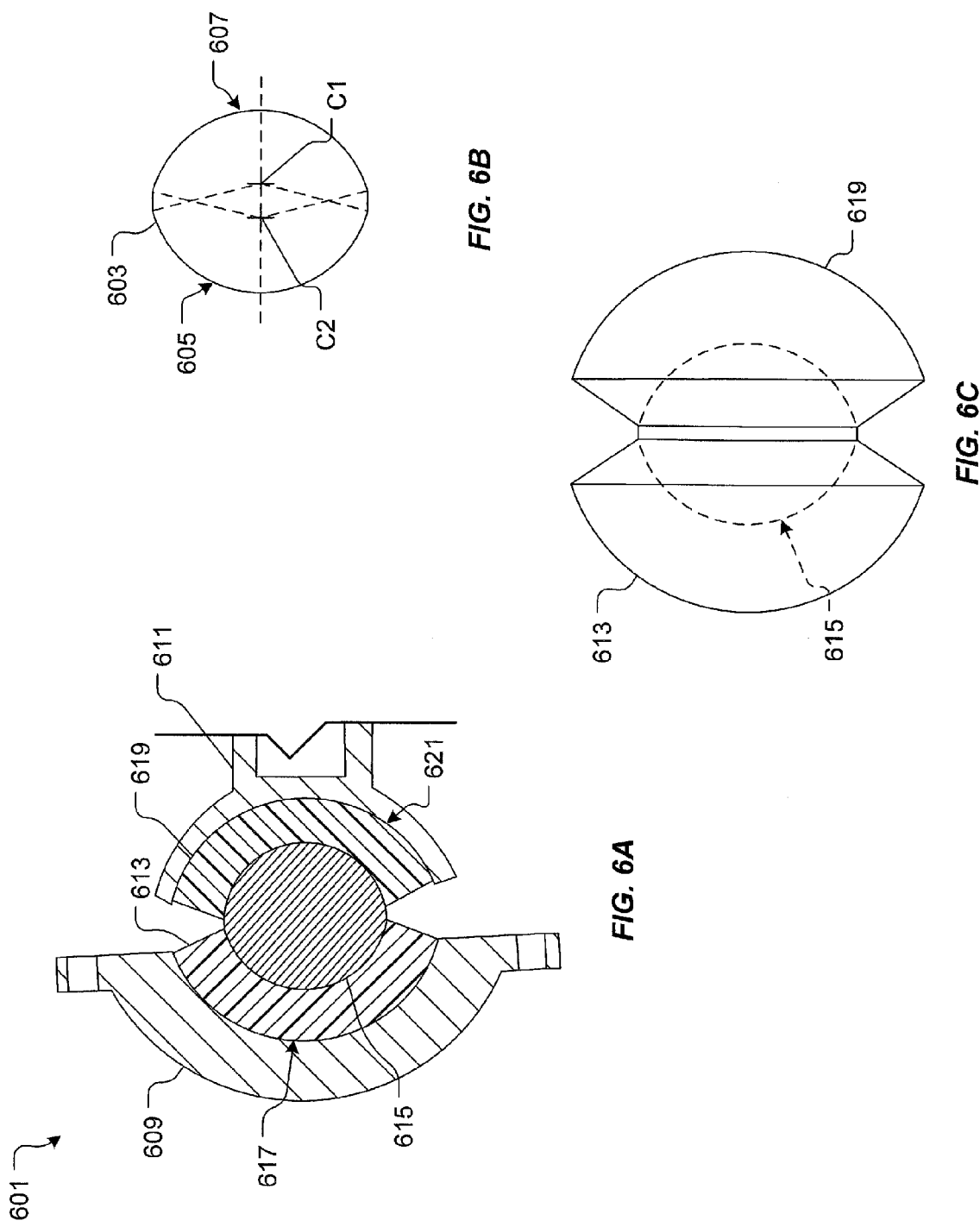
FIG. 6A-C are various views of an alternative embodiment of a bearing assembly element.

In FIGS. 6A-6C, various view of an alternative embodiment of bearing assembly 317 is shown. Bearing assembly 601 is similar to bearing assembly 319, wherein both bearing assemblies utilize a bearing element disposed between elastomeric material for reacting blade loads during flight. In this exemplary embodiment, bearing assembly 601 includes an anti-symmetrical bearing element 603 having two opposing contoured surfaces 605 and 607.

In FIG. 6B, surface 605 is formed of a curved profile having a center focal point C1, while surface 607 is formed of a curved profile having a center focal point C2. In the illustrative embodiment, center focal point C1 is offset from center focal point C2; thus, forming an anti-symmetrical bearing element. It will be appreciated that one of the unique features of bearing element 603 is that the bearing element takes less space than conventional spherical elements.

Referring to FIG. 6B, element 603 is shown securely bonded to a housing 609 and a support member 611. Disposed between element 603 and housing 609 is a first elastomeric material 613 bonded to the outer surface 615 of element 603 and an inner surface 617 of housing 609. A second elastomeric material 619 is disposed between outer surface 615 and an inner surface 621 of member 611. In the preferred embodiment, bonding of elastomeric material 613 and 619 is achieved through a vulcanization process; however, it should be appreciated that other bonding process could be utilized in lieu of the preferred embodiment. An optional feature would include layering a plurality of rigid shims within the elastomeric material for adding additional support and rigidity.

Figure 7:
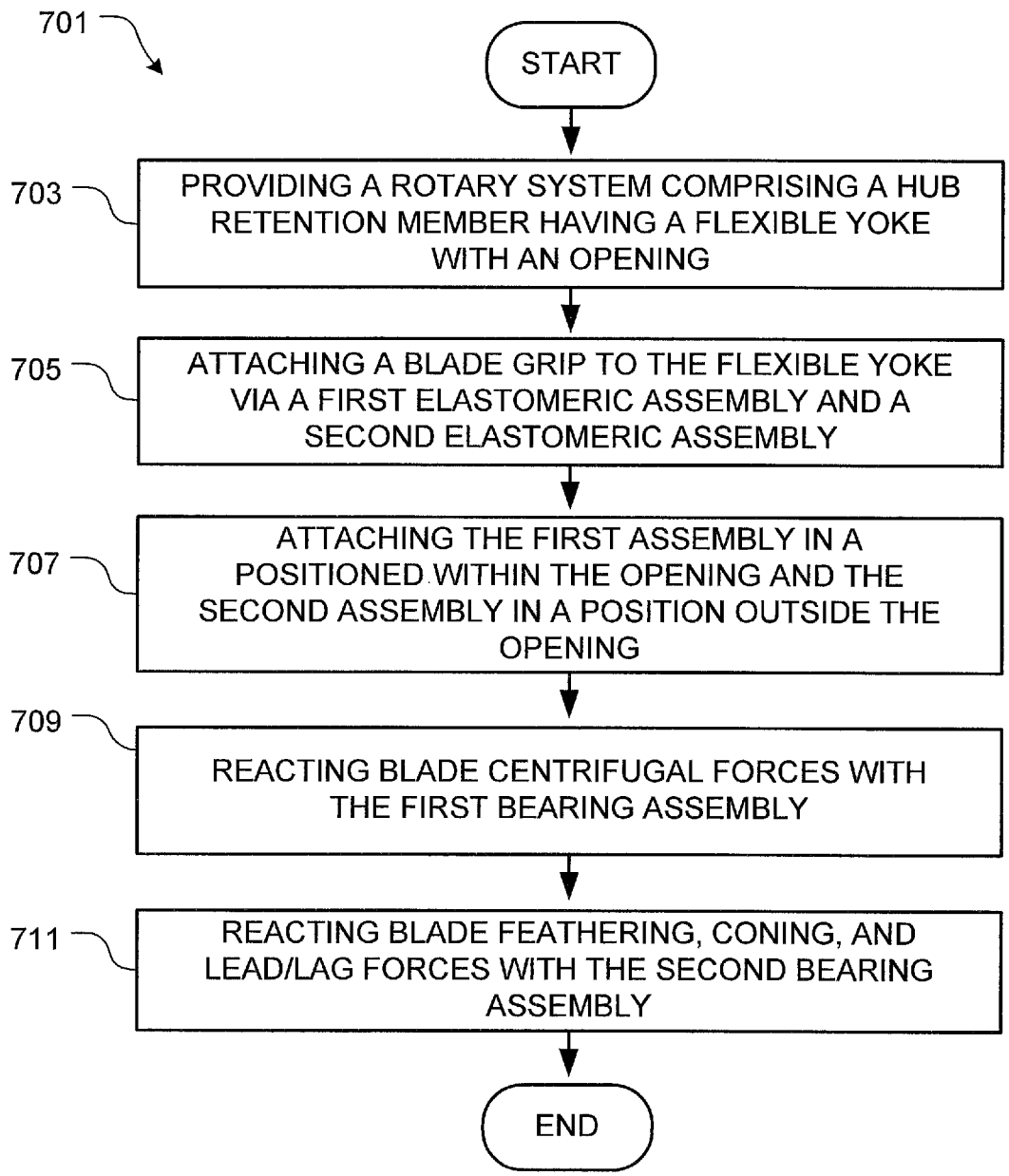
FIG. 7 is a flow chart depicting the preferred method.

Referring next to FIG. 7 in the drawings, a flowchart 701 depicting the preferred process is shown. Box 703 comprises the first step, which includes providing a rotary system having a retention member with a flexible yoke forming an opening. The next step includes attaching the blade grip to the flexible yoke with a first and a second bearing assembly, as depicted in box 705. The bearing assemblies are selective attached to the bridge, as depicted in box 707. Finally, the first and second bearing assemblies are adapted to control the blades forces exerted on the retention member, namely, centrifugal, feathering, coning, and lead/lag blade forces, as depicted in boxes 709 and 711.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A rotary system for a rotary aircraft, comprising:
   a retention member, having:
   an upper spoke arm; and
   a lower spoke arm;
   a flexible yoke, having:
   an opening forming a bridge;
   a blade grip for attaching a rotor blade to the flexible yoke, the grip having:
   a base;
   a first plate and a second plate extending from the base; and
   a grip support member attached to the base and extending in a direction opposite to the first plate and the second plate;
   a first bearing assembly for attaching the blade grip support to the retention member; and
   a non-symmetrical second bearing assembly for attaching the base of the blade grip to the bridge of the flexible yoke;
   the second bearing assembly comprising:
   a bearing element disposed between a first elastomeric material and a second elastomeric material, the bearing element having:
   a first surface forming a spherical contouring facing outboard; and
   a second surface forming a conical contouring facing inboard;
   wherein the first elastomeric material takes the form of and bonds to the first surface; and
   wherein the second elastomeric material takes the form of and bonds to the second surface;
   wherein the flexible yoke, first bearing assembly, and second bearing assembly react rotor blade forces exerted on the retention member during flight.

2. The rotary system of claim 1, wherein only the flexible yoke, first bearing assembly, and second bearing assembly attach the rotor blade to the retention member.

3. The rotary system of claim 1, wherein the first bearing assembly is a shear bearing.

4. The rotary system of claim 1, wherein the first bearing assembly is attached to the upper spoke arm and the lower spoke arm of the retention member.

5. The rotary system of claim 1, wherein the first bearing assembly is composed of elastomeric material.

6. The rotary system of claim 1, wherein the first bearing assembly extends through the opening of the flexible yoke.

7. The rotary system of claim 1, wherein the base of the grip extends through the opening of the flexible yoke.

8. The rotary system of claim 1, the bearing assembly further comprising:
   a bearing housing bonded to the first elastomeric material; and
   a support member bonded to the second elastomeric material.

9. A rotary system for a rotary aircraft, comprising:
   a retention member;
   a flexible yoke, having:
   an opening forming a bridge;
   a first bearing assembly extending through the opening of the yoke and configured to secure a rotor blade to the retention member; and
   a second non-symmetrical bearing assembly extending through the opening of the flexible yoke and configured to secure the rotor blade to the bridge;
   the second bearing assembly comprising:
   a bearing element disposed between a first elastomeric material and a second elastomeric material, the bearing element having:
   a first surface forming a spherical contouring facing outboard; and
   a second surface forming a conical contouring facing inboard;
   wherein the first elastomeric material takes the form of and bonds to the first surface; and
   wherein the second elastomeric material takes the form of and bonds to the second surface;
   wherein the flexible yoke, first bearing assembly, and second bearing assembly react rotor blade forces exerted on the retention member during flight.

10. The rotary system of claim 9, further comprising:
    a blade grip rigidly attached to the blade and elastically attached to the first bearing assembly and the second bearing assembly.

11. The rotary system of claim 10, the blade grip comprising:
    a base extending through the opening of the flexible yoke;
    a first plate and a second plate extending from the base; and
    a grip support member attached to the base and extending in a direction opposite to the first plate and the second plate;
    wherein the first plate and the second plate rigidly attach to a root portion of the blade.

12. The rotary system of claim 11, wherein the second bearing is disposed between the first plate and the second plate.

13. The rotary system of claim 12, wherein the second bearing is attached to the base of the blade grip.

14. The rotary system of claim 10, wherein only the flexible yoke, first bearing assembly, and second bearing assembly attach the grip to the retention member.

15. The rotary system of claim 9, wherein the first bearing assembly is a shear bearing.

16. A rotary system for a rotary aircraft, comprising:
a retention member;
a flexible yoke, having:
   an opening forming a bridge;
a first bearing assembly disposed within the opening of the yoke and configured to secure a rotor blade to the retention member; and
a second non-symmetrical bearing assembly disposed within the opening of the flexible yoke and configured to secure the rotor blade to the bridge of the flexible yoke, the second bearing element, having:
   a bearing element disposed between a first elastomeric material and a second elastomeric material, the bearing element having:
      a first surface forming a spherical contouring; and
      a second surface forming a conical contouring;
   wherein the first elastomeric material takes the form of and bonds to the first surface; and
   wherein the second elastomeric material takes the form of and bonds to the second surface.

17. The rotary system of claim 16, further comprising:
a blade grip rigidly attached to the blade and elastically attached to the first bearing assembly and the second bearing assembly, the blade grip comprising:
   a base disposed within the opening of the flexible yoke;
   a first plate and a second plate extending from the base; and
   a grip support member attached to the base and extending in a direction opposite to the first plate and the second plate;
wherein the first plate and the second plate rigidly attach to a root portion of the blade.

18. The rotary system of claim 17, wherein the second bearing is disposed between the first plate and the second plate; and
   wherein the second bearing is attached to the base of the blade grip.

* * * * *